United States Patent

Start et al.

[11] 3,723,472
[45] Mar. 27, 1973

[54] SYNTHESIS OF 2,2-DIMETHYL-7-BENZOFURANOL

[75] Inventors: John F. Start; Donald L. Towns, both of Trenton, N.J.

[73] Assignee: FMC Corporation, New York, N.Y.

[22] Filed: Nov. 27, 1970

[21] Appl. No.: 93,289

[52] U.S. Cl. ..........................................260/346.2 R
[51] Int. Cl. ................................................C07d 5/36
[58] Field of Search ..............................260/346.2 R

[56] References Cited

UNITED STATES PATENTS 3,320,286   5/1967   Franko-Filipasic............260/346.2 R

OTHER PUBLICATIONS

Fieser and Fieser, Advanced Organic Chem., N.Y., Reinhold, (1961) p. 727–730.
Cram and Hammond, Organic Chem., N.Y., McGraw–Hill (1959) p. 303.

Primary Examiner—Alex Mazel
Assistant Examiner—Bernard Dentz
Attorney—Robert D. Jackson, Eugene G. Seems and Pauline Newman

[57] ABSTRACT

The hydrolysis of 2,3-dihydro-2,2-dimethylbenzofuran-7-diazonium bisulfate to produce 2,3-dihyro-2,2-dimethyl-7-benzofuranol is carried out in the presence of a catalytic amount of a cuprous compound. The cuprous compound accelerates hydrolysis of the diazonium salt with concomitant reduction of tarry by-products.

5 Claims, No Drawings

SYNTHESIS OF 2,2-DIMETHYL-7-BENZOFURANOL

BACKGROUND OF THE INVENTION

A. Field of the Invention

This invention relates to diazonium reactions, particularly the preparation of phenolic compounds by the hydrolysis of diazonium salts.

B. Discussion of the Prior Art

In U. S. Pat. No. 3,320,286 to Franko-Filipasic, there is described a process of preparing 2,3-dihydro-2,2-dimethyl-7-benzofuranol, the immediate precursor for the agriculturally important insecticidal compound, 2,3-dihydro-2,2-dimethyl-7-benzofuranyl N-methylcarbamate and sold under the trademark FURADAN. The Franko-Filipasic process comprises a seven stage chemical synthesis, the reaction sequence of which can be expressed by the following equations;

(1) $\text{o-nitrophenol} + \text{ClCH}_2\text{C(CH}_3\text{)=CH}_2 \xrightarrow{\text{acid acceptor}}$ (2) $\text{o-nitrophenyl-OCH}_2\text{-C(CH}_3\text{)=CH}_2 + \text{HCl}$ $\xrightarrow{\text{heat}}$ (3) 2-nitro-4-(2-methylallyl)phenol $\xrightarrow{\text{acid catalyst}}$ (4) 2-nitro-2,2-dimethyl-2,3-dihydrobenzofuran $\xrightarrow{3[\text{H}_2]}$ (5) 7-amino-2,3-dihydro-2,2-dimethylbenzofuran $\xrightarrow[\text{NaNO}_2]{2\text{H}_2\text{SO}_4}$ (6) [diazonium]$^{\oplus}$ $\text{HSO}_4^{\ominus} + \text{NaHSO}_4$ $+ \text{H}_2\text{O} \xrightarrow[\text{H}_2\text{O}]{\text{hydrolysis}}$ (7) 2,3-dihydro-2,2-dimethyl-7-benzofuranol $+ \text{N}_2 + \text{H}_2\text{SO}_4$ Excellent yields are realized at each step and the overall process is generally satisfactory. However, in some instances, tarry by-products are formed during hydrolysis of the diazonium salt to the 7-hydroxybenzofuranol. Apparently, the diazonium salt couples in competition with the desired hydrolysis. The effect is more acute and troublesome in plant operations where the diazonium solutions are used in relatively high concentrations in order to conserve volumetric space.

SUMMARY OF THE INVENTION

It has now been discovered that the hydrolysis of 2,3-dihydro-2,2-dimethylbenzofuran-7-diazonium salt to produce 2,3-dihydro-2,2-dimethyl-7-benzofuranol is greatly accelerated and tar formation diminished by carrying out the hydrolysis in the presence of a cuprous compound and the provision of such a process constitutes the principal object and purpose of the invention.

DESCRIPTION OF THE PREFERRED EMBODIMENTS

In carrying out the invention, we generally proceed in the manner prescribed in the aforecited Franko-Filipasic patent of preparing and hydrolyzing 2,3-dihydro-2,2-dimethylbenzofuran-7-diazonium salt except we conduit the hydrolysis in the presence of a catalytic amount of a cuprous compound.

The diazotization is performed by reacting 7-amino-2,3-dihydro-2,2-dimethylbenzofuran with sodium nitrite and excess mineral acid in accordance with the equation in step (6) of the synthesis scheme aforesaid. Suitable mineral acids include hydrochloric, hydrobromic, phosphoric, perchloric, sulfuric and the like. Hydrohalic acids tend to give halogen substitution at the 7-position and are therefore not recommended. Sulfuric acid is preferred. The reaction readily takes place at about room temperature. The reaction medium can be cooled below room temperature to minimize decomposition.

2,3-dihydro-2,2-dimethyl-7-benzofuranol is formed by contacting the 2,3-dihydro-2,2-dimethylbenzofuran-7-diazonium salt with water at elevated temperatures in the presence of the cuprous compound. The hydrolysis of the diazonium salts proceeds in accordance with the equation of step (7) of the synthesis aforesaid. Suitable methods for conducting the hydrolysis include contacting the diazonium salt with superheated steam and/or with mineral acid at elevated temperatures, generally in the neighborhood of 100°C. The presence of cupric sulfate suppresses reduction of the diazonium salt whereby the diazonium function is replaced with hydrogen rather than the desired hydroxyl group. Rapid removal of the product from the reaction is desirable. This may be accomplished by steam distillation or solvent extraction on a continuing basis. If steam distillation is used, recovery of product is effected by decantation or by solvent extraction of the steam distillate.

Any cuprous compound or a precursor thereof is suitable for practicing the invention. Cuprous oxide is preferred and has the advantage of low cost and availability. Another source of the cuprous compound is to form it in situ by the action of a reducing agent e.g. copper powder or sodium sulfite on a cupric salt such as the cupric sulfate aforesaid. Cuprous halides are least desirable as these may cause halogen substitution.

So far as we have been able to ascertain, the action of the cuprous compound in accelerating hydrolysis of the diazonium salt, is catalytic in nature; at least it is effective in amounts normally used in catalytic reactions. Expressed in numerical terms, the mole ratio of cuprous compound to diazonium salt is conveniently maintained from about 0.00041 to about 0.0029. It is to be understood however, that catalytic activity of the cuprous compound is still manifest outside these ranges. However, unusually heavy loadings can give rise to erratic hydrolysis rates while less than the lower range limit may not be completely effective. The optimum mole ratio is of the order of about 0.00164.

The hydrolysis is conducted in an acidic aqueous solution of the 2,3-dihydro-2,2-dimethylbenzofuran-7-diazonium salt which, in common with most diazonium salts is unstable and may even explode if isolated in pure form. The strength of the aqueous diazonium salt is based on the concentration of the amine precursor.

Further details of the invention are provided in the following examples.

EXAMPLE 1

Hydrolysis of 2,3-Dihydro-2,2-dimethylbenzofuran-7-diazonium Bisulfate

A 1-liter glass reactor equipped with a heating mantle was agitated with a 2-inch paddle stirrer at 500 rpm. A thermometer, charge flask, and reflux condenser were utilized. The closed, pressure-equalized system was connected to a sensitive manometer. The evolution of nitrogen from the reactor was measured by displacement of water from a burette at constant pressure. Into the reactor was placed a hydrolyzing mixture consisting of:

| | |
|---|---|
| 115 g | recrystallized copper sulfate ($CuSO_4 \cdot 5H_2O$) |
| 23.5 g | sulfuric acid (97.7%) |
| 183 g | distilled water |
| 75 ml | mixed xylenes |

The solution was heated with stirring at 500 rpm. to reflux at 96°C. The system was equilibrated to constant temperature and pressure. At this time a portion of cuprous oxide, weighted to the nearest milligram, was added to the reactor. A charge of 10 milliliters (6.8 millimoles) of an aqueous solution of diazonium bisulfate then was added to the reactor. After cessation of nitrogen evolution plus three to 5 minutes, the reactor contents were allowed to cool to 90°C. The reaction mass was then transferred to a separatory funnel and the phases allowed to separate. The organic phase was retained for gas chromatographic analysis.

Using the aforesaid procedure, eight examples were carried out, including a blank run. The results are summarized in the following table.

EFFECTS OF CUPROUS OXIDE ON HYDROLYSIS OF DIHYDRO-2,2-DIMETHYLBENZOFURAN7-DIAZONIUM-2,3-BISULFATE

| Run No. | $Cu_2O$ Concentration (mg/liter) | Mole Ratio of $Cu_2O$ to Diazonium salt | Reaction Half-life (sec) | Yield gas liquid phase chromotography (glpc) |
|---|---|---|---|---|
| 1 | 0 | 0 | 760 | 81.2 |
| 2 | 40 | 0.00041 | 88 | 87.8 |
| 3 | 80 | 0.00082 | 64 | 91.6 |
| 4 | 120 | 0.00123 | 56 | 91.0 |
| 5 | 160 | 0.00164 | 32 | 91.0 |
| 6 | 200 | 0.00205 | 45 | 91.0 |
| 7 | 240 | 0.00246 | 33 | 92.5 |
| 8 | 280 | 0.00287 | 22 | 88.0 |

As can be seen from the results summarized in the table, the reaction half-life is much lower when using cuprous oxide. That the accelerated half-life values are due to an increase in the rate of hydrolysis is supported by the higher yield of the final 2,3-dihydro-2,2-dimethylbenzofuranol. The beneficial effect of the cuprous compound is clearly manifest.

The 2,3-dihydro-2,2-dimethylbenzofuran-7-diazonium bisulfate was prepared by adding 20 g. (0.1226 mole) of amine to dilute sulfuric acid (17.65 g concd. $H_2SO_4$ in 100 ml distilled water). This mixture was cooled in an ice bath. To this cooled solution was added an aqueous solution of sodium nitrite (8.74 g, 0.1261 moles in 40 ml distilled water). The temperature was kept below 8°C. by slowly adding the sodium nitrite over a period of 15 min. This mixture was stored in the refrigerator until needed. A 10 ml portion of this solution assayed as 6.8 millimoles of the diazonium salt.

What is claimed is:

1. In the preparation of 2,2-dimethyl-7-benzofuranol by the hydrolysis of 2,3-dihydro-2,2-dimethyl benzofuran-7-diazonium salt, the improvement which comprises carrying out the hydrolysis in the presence of a catalytic amount of a cuprous compound.

2. The improvement according to claim 1 wherein the diazonium salt is the bisulfate ($-HSO_3$).

3. The improvement according to claim 2 wherein the cuprous compound is cuprous oxide, ($Cu_2O$).

4. The improvement according to claim 3 wherein the mole ratio of cuprous oxide to diazonium salt is in the range of 0.00041 to 0.0029.

5. The improvement according to claim 1 wherein the cuprous compound is formed in situ by reduction of a cupric salt.

* * * * *